(No Model.) 2 Sheets—Sheet 1.

A. GILMORE.
FLAX THRASHING ATTACHMENT FOR THRASHING MACHINES.

No. 502,356. Patented Aug. 1, 1893.

WITNESSES:
Chas. Nida.
C. Sedgwick

INVENTOR
A. Gilmore
BY
Munn & Co
ATTORNEYS.

(No Model.) 2 Sheets—Sheet 2.
A. GILMORE.
FLAX THRASHING ATTACHMENT FOR THRASHING MACHINES.
No. 502,356. Patented Aug. 1, 1893.
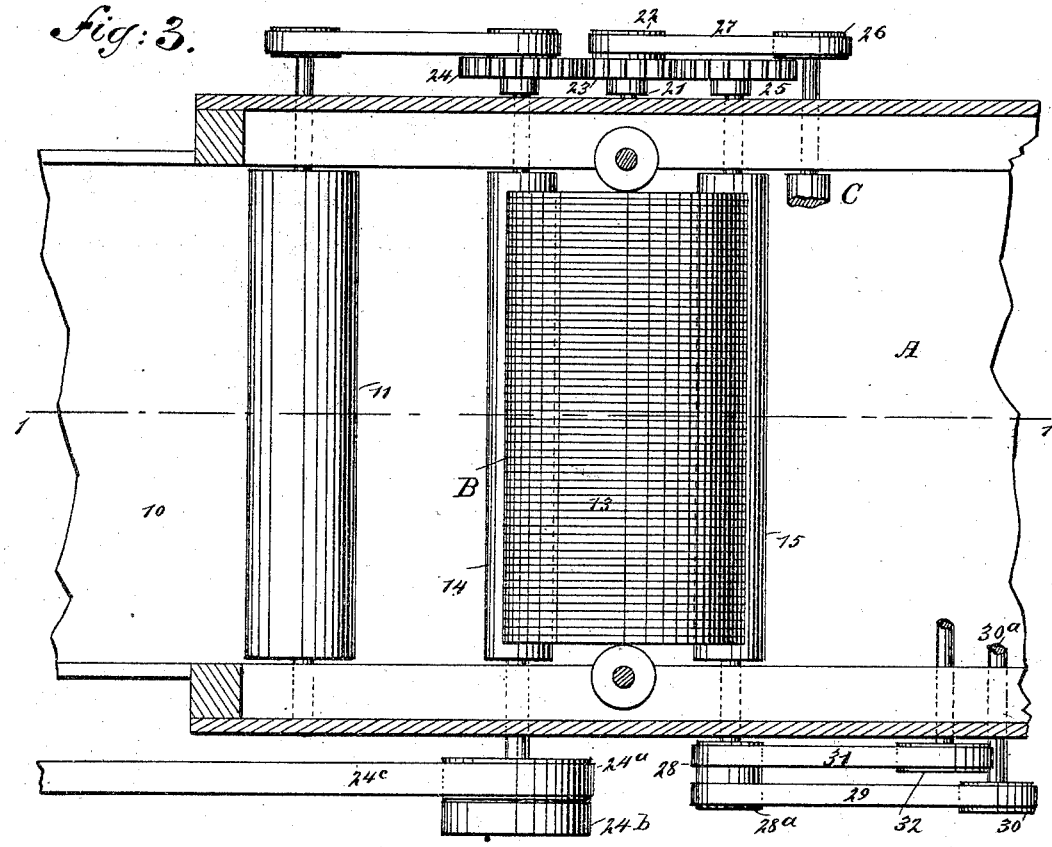
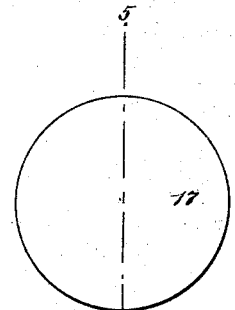
WITNESSES:
Chas. Nieu.
C. Sedgwick
INVENTOR
A. Gilmore
BY Munn & Co
ATTORNEYS.

UNITED STATES PATENT OFFICE.

ALFRED GILMORE, OF STILLWATER, MINNESOTA.

FLAX-THRASHING ATTACHMENT FOR THRASHING-MACHINES.

SPECIFICATION forming part of Letters Patent No. 502,356, dated August 1, 1893.

Application filed July 12, 1892. Serial No. 439,789. (No model.)

*To all whom it may concern:*

Be it known that I, ALFRED GILMORE, of Stillwater, in the county of Washington and State of Minnesota, have invented a new and Improved Flax-Thrashing Attachment for Thrashing-Machines, of which the following is a full, clear, and exact description.

My invention relates to a flax-thrashing attachment for thrashing machines, and has for its object to provide a device to be substituted for the usual cylinder and concave in such machines; and a further object of the invention is to so construct the attachment that flax seed may be thrashed from the straw without breaking or in any manner injuring the latter.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
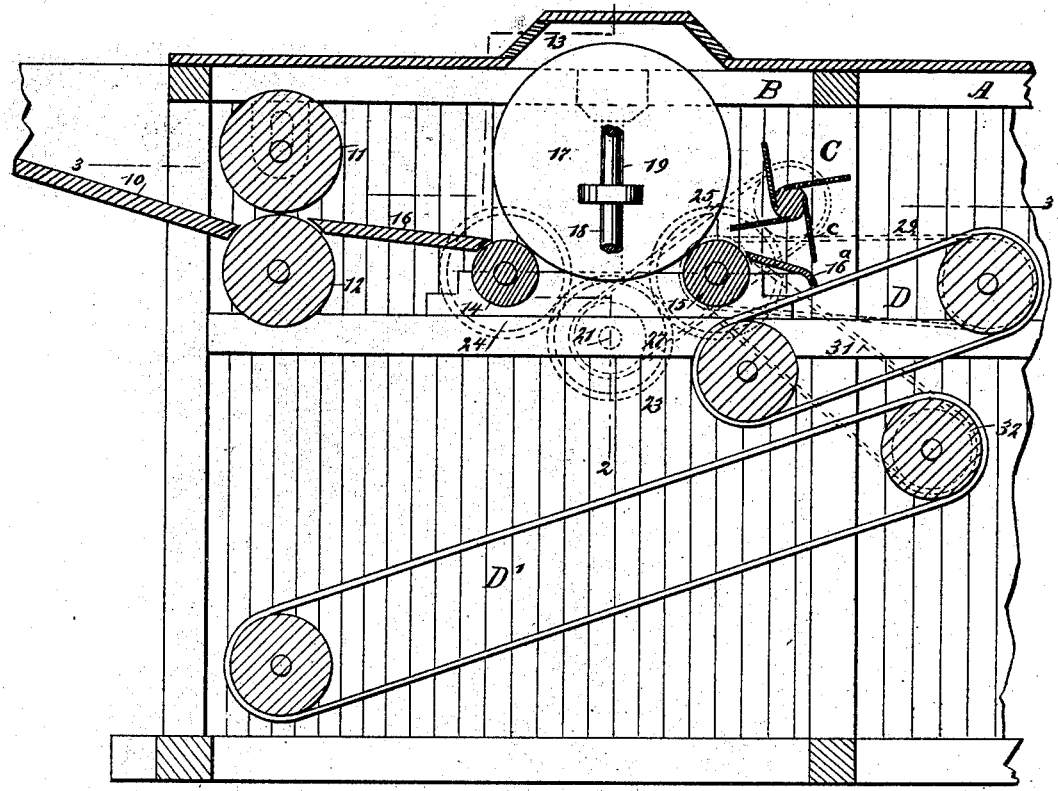
Figure 2:
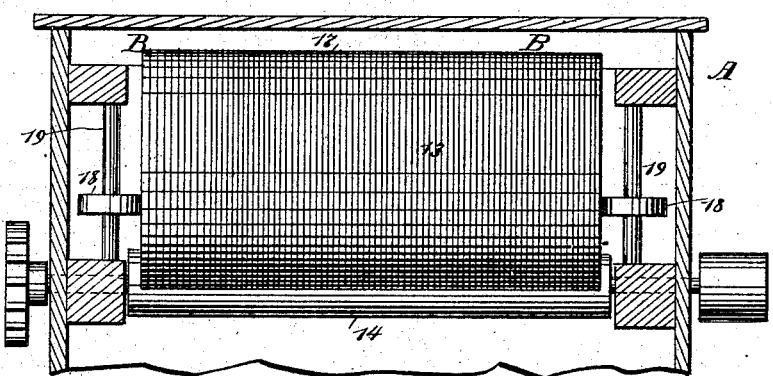

Figure 1 is a vertical section through a portion of the thrasher, illustrating the application of the improvement thereto, the section being taken on the line 1—1 of Fig. 3. Fig. 2 is a section taken in front of the pressing roller and practically on the line 2—2 of Fig. 1. Fig. 3 is a horizontal section taken essentially on the line 3—3 of Fig. 1. Fig. 4 is a side view of one of the disks of which the pressing roller is constructed; and Fig. 5 is a vertical section through the disk, the section being taken essentially on the line 5—5 of Fig. 4.

Adjacent to the opening in the thrasher box A into which the feed table 10, is led, two feed rollers 11 and 12, are located, and ordinarily the upper roller is of greater diameter than the lower one, as when so constructed it feeds better and is more readily driven. These rollers are so placed that the straw entering the box from the feed table will pass between them. A group of thrashing rolls B, is arranged in front of the feed rollers, three rolls constituting a group, namely, an upper pressing roll 13 of large diameter, and two lower supporting rolls 14 and 15 of much smaller diameter, the pressing roll being adapted to turn upon the supporting rolls, receiving movement from them, and the pressing roll has no other vertical bearing than the lower supporting rolls. At the rear of the group of thrashing rolls a beater C, is constructed, the wings c of the beater being constructed of leather or other yielding material.

I desire it to be distinctly understood that although but one group of thrashing rolls has been illustrated any desired number of groups may be employed.

Beneath the beater and the rear portion of the thrashing rolls a carrying belt D, is located, and beneath the carrying belt, the feed rollers and thrashing rolls a grain apron D', is placed, as is best shown in Fig. 2. Between the lower feed roller and the adjacent lower roll of the thrashing group a table 16, is erected, whereby the grain passing from between the feed rollers will be conducted between the upper and lower rolls of the thrashing group; and a second table 16$^a$, is erected between the beater and the rear supporting roll 15, the table 16$^a$, being adapted to conduct the straw to the carrier belt D, the grain falling upon the apron D'; the wings of the beater C, are preferably made to engage with the upper surface of the rear table 16$^a$ when the beater is revolved.

The peculiarity in the construction of the attachment rests mainly in that of the upper or pressing roll 13 of the thrashing group. This roll has no trunnions and is not pivoted or journaled in the sense in which that word is usually employed. As the roll is made up of a series of disks 17, shown in detail in Figs. 4 and 5, and these disks are placed side by side, they are of equal diameter and their peripheries are preferably smooth. When a sufficient number of disks has been loosely placed together to constitute a pressing roll of proper length they are held in free contact with each other supported by the lower rolls 14 and 15, by means of guide rollers 18, which rollers have bearing against the outer sides of the end disks of the pressing roll, as shown in Figs. 2 and 3, the guide rollers being secured upon spindles 19, journaled practically in the box of the thrasher in suitable bearings. Below the composite roll, as the pressing roll may be properly so denominated, and between the supporting rolls 14 and 15, a shaft 21, is journaled, and this shaft carries a pulley 22 and likewise a gear wheel 23; and upon the trunnion or shaft of each supporting roll 14 and 15 a gear wheel is mounted, the gears being designated as 24 and 25, and they mesh with the gear wheel 23 which is between them. The trunnion of the roll 14 at the end opposite that carrying the gear 24, is provided with a fixed and a loose pulley, designated as 24$^a$ and 24$^b$, and a driving belt 24$^c$, is applied to these pulleys. The driving pulley 24$^a$, is preferably made of equal size to the gear wheel 24. Motion is thereby communicated, through the medium of the gear wheel 24 and the gear 23, to the rear supporting roll 15. The beater shaft has secured to it a pulley 26, and this pulley is connected by a belt 27 with the pulley 22 on the shaft 21. The shaft or trunnion of the rear supporting roll 15, is provided with two pulleys designated as 28 and 28$^a$. These pulleys are connected, one by a belt 29 with a driving pulley 30, located upon an upper shaft 30$^a$, carrying the drum over which the apron of the straw carrier E passes, while the other pulley is connected by a belt 31 with a driving pulley 32 of the grain belt D'. By constructing the beater arms or wings of a soft material, the straw with which the beater comes in contact is not injured in its passage to the carrier D.

In operation, the flax straw is taken from the reaper and is fed into the machine by means of the feed board or table 10. The straw upon leaving the feed board or table is received between the feed rollers and is conducted over the table 16; it is then caught between the upper pressing roll and the lower supporting rolls of the thrashing group, and the grain is effectually separated from the straw and drops downward upon the grain belt D', while the straw is passed over the rear table 16$^a$, and is engaged by the wings of the beater C, the beater acting to shake out the last grain that may be held in the straw, after which the straw is received by the carrier D and is delivered wherever desired.

The flax straw fed into or between the feed rollers will vary in thickness along the face of said rollers, and as it passes through the group of thrashing rolls the disks constituting the pressing roll of the group will rise and fall in proportion to the thickness of the straw immediately under it, thus pressing equally upon the straw all along the length of the thrashing rolls and preventing any unbroken balls or heads of flax from escaping, and as the rolls throughout have no uneven surfaces the straw is delivered unbroken.

Having thus described my invention, I claim as new and desire to secure by Letters Patent—

1. In a thrashing machine, the combination, with a feed mechanism, of a thrashing group of rollers, consisting of lower supporting rollers journaled in suitable bearings, and an upper pressing roller resting upon the supporting roller, the pressing roller being a composite roller which consists of a series of independent disks arranged side by side in free contact, and guides engaging with the end disks and maintaining all the disks in said free contact, the disks having no other vertical support but the supporting rollers, substantially as shown and described, whereby the pressing roller will accommodate itself to an unlimited extent throughout its length to varying thickness of material presented to it, as and for the purpose specified.

2. A thrashing mechanism for thrashing machines, the same consisting of feed rollers, a group of thrashing rollers located adjacent to the feed rollers, said group comprising lower journaled supporting rollers, an upper pressing roller having no journals or bearings, resting upon the supporting rollers and comprising a series of independent disks placed side by side, guides bearing against the ends of the pressing roller, and a beater having arms of a pliable material located in advance of the thrashing group of rollers, substantially as and for the purpose set forth.

ALFRED GILMORE.

Witnesses:
 H. E. SMITH,
 H. S. SMITH.